Feb. 6, 1968        J. C. LEJON        3,368,126
RECORDER DRIVE INCLUDING A SINGLE-PHASE,
SHADED-POLE, SPRING-BIASED, A.C.
MOTOR CONTROLLED BY A
POTENTIOMETER CIRCUIT

Filed May 20, 1964                     3 Sheets-Sheet 1

INVENTOR.
JEAN C. LEJON
BY John T. Luhrs
ATTORNEY

Feb. 6, 1968

J. C. LEJON 3,368,126

RECORDER DRIVE INCLUDING A SINGLE-PHASE,
SHADED-POLE, SPRING-BIASED, A.C.
MOTOR CONTROLLED BY A
POTENTIOMETER CIRCUIT

Filed May 20, 1964

INVENTOR.
JEAN C. LEJON
BY
*John F. Luhrs*
ATTORNEY

United States Patent Office 3,368,126
Patented Feb. 6, 1968

3,368,126
RECORDER DRIVE INCLUDING A SINGLE-PHASE, SHADED-POLE, SPRING-BIASED, A.C. MOTOR CONTROLLED BY A POTENTIOMETER CIRCUIT
Jean C. Lejon, Paris, France, assignor to Control Bailey (Societe Anonyme), a company of France
Filed May 20, 1964, Ser. No. 368,909
Claims priority, application France, Nov. 13, 1963, 953,642
4 Claims. (Cl. 318—18)

ABSTRACT OF THE DISCLOSURE

An electric recorder including a single-phase, shaded-pole motor and an indicating member driven in either of two directions depending on the level of an electric control signal applied to the motor. A restoring spring counters the unidirectional indicator movement produced by the motor and establishes counter movement of the indicator when the motor torque developed by the control signal is less than that developed by the spring. Indicator equilibrium is established when the torques respectively developed by the motor and the spring are of equal magnitude and opposite directions.

The present invention relates to an electric signal recorder of the type including an electric servomotor controlling the motion of a stylus, a pen or other curve-tracing instrument and itself controlled from the electric signal, the variations of which it is desired to graphically record. More specifically, the invention relates to a recorder of the described class in which said servomotor is a single-phase, single-winding, squirrel cage alternating-current motor of the shaded-pole type, that is of the type in which the part played by an auxiliary phase winding is simulated by short-circuited rings surrounding parts of the magnetic poles. As will be seen later on, the use of such a motor is made possible, in the device of the invention, by the provision of a restoring spring associated therewith.

It is well known that recorders, in which the position of a stylus or other graphic recording means is controlled by an electric servomotor, generally use motors capable of rotating in either direction. In the case where the motor operates from direct-current, its rotation direction changes according to the polarity of the electric control signal applied thereto. In the more usual case, where the servomotor is a two-phase alternating-current induction motor, the rotation direction changes according to the phase of the current fed to the control winding, which may be leading or lagging by ninety degrees with respect to the constant phase current supplied to the other winding.

An object of the invention is to provide a servomotor recorder in which the motor is a single-phase, single-winding induction motor, the cost of which is definitely lower than that of the two-phase motors generally employed in recorders of the same class.

More precisely, the recorder of this invention makes use of a single-phase "shaded pole" alternating-current motor of the well-known type in which the auxiliary phase is developed by short-circuit rings suitably arranged around the magnetic poles. Such motors are extensively employed in appliances requiring but a very small power, such as, for instance, blowers, record playback equipment, etc. One advantage of the shaded-pole motor is that no auxiliary starting devices are required, such as extra windings, inductors, capacitors or switching means for disconnecting such auxiliary elements after the motor has been started.

One drawback of the single-phase shaded-pole motor is that it can rotate in one direction only. According to a feature of the invention, this drawback is obviated by the use of a restoring spring mechanically coupled with the motor by suitable coupling means and which counters the torque of the motor. Consequently, the motor rotates in one or the other of two possible directions according to whether the torque is higher or lower than the counter-torque introduced by the spring. Thus, the equilibrium position of the motor is not that which corresponds to a zero control signal, but that in which the torques respectively arising from the motor and the spring are of equal magnitudes and opposite directions.

According to the invention, there is provided a recorder comprising a graphic record support medium, a stylus carrying carriage cooperating with said support medium, guiding means for said carriage to which the sliding contact of a potentiometer is secured, a potentiometer resistance borne by said guiding means and fed from a reference electric current source, means for deriving from said resistance and sliding contact an output voltage depending on the position of said carriage, means for subtracting said voltage from a control signal so as to derive therefrom an error signal, a single-phase single-winding alternating-current induction motor provided with short-circuited rings surrounding part of the magnetic poles thereof, a spiral spring, means for mechanically coupling said motor, spring and carriage, means for amplifying said error signal and means for applying the amplified error signal to the single phase winding of said motor to thereby position said carriage until said error signal is reduced to substantially zero.

Other objects and advantages of the invention will appear from the following detailed description, made with reference to the annexed drawing, of which:

Figure 1:
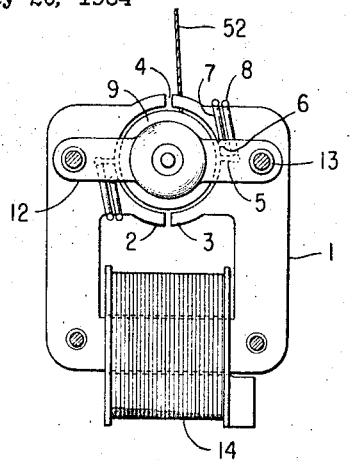
FIGS. 1 and 2 show the structure of a conventional single-phase, short-circuited ring alternating-current motor.
Figure 2:
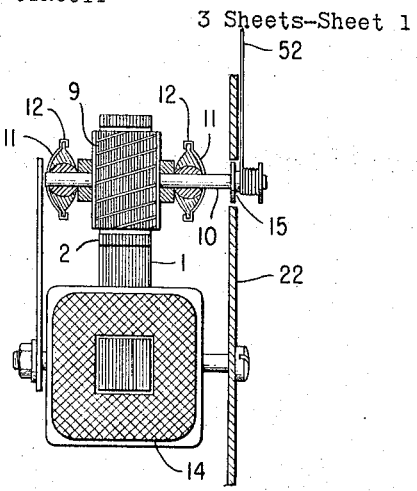

A single-phase, single-winding, short-circuited ring alternating-current induction motor 1 is shown in FIGS. 1 and 2. It comprises a U-shaped magnetic circuit made of stacked magnetic laminations and having two projecting poles 2 and 3 between which the air gap 4 extends. Each pole is provided with slots such as 5 and 6; and the parts of the pole between said slots and its outer lateral surface are surrounded by closed metal rings 7 and 8. In this manner, each pole is divided into a main pole and two minor, short-circuited poles. A squirrel cage rotor 9 of the conventional type rotates in the air gap, and its shaft 10 is held in place by bearings 11, which are themselves supported by flanges 12 secured to the main body by suitable means such as threaded rods. A single-phase winding 14 is wound around the central part of the magnetic circuit, near the base of the U. It is well known that a motor built to this description rotates in a direction from the main poles toward the minor short-circuited poles.

A pulley 15 is secured to the shaft 10 and drives the stylus-holder and carriage, without any reduction gear as will be explained later on.

Figure 3:
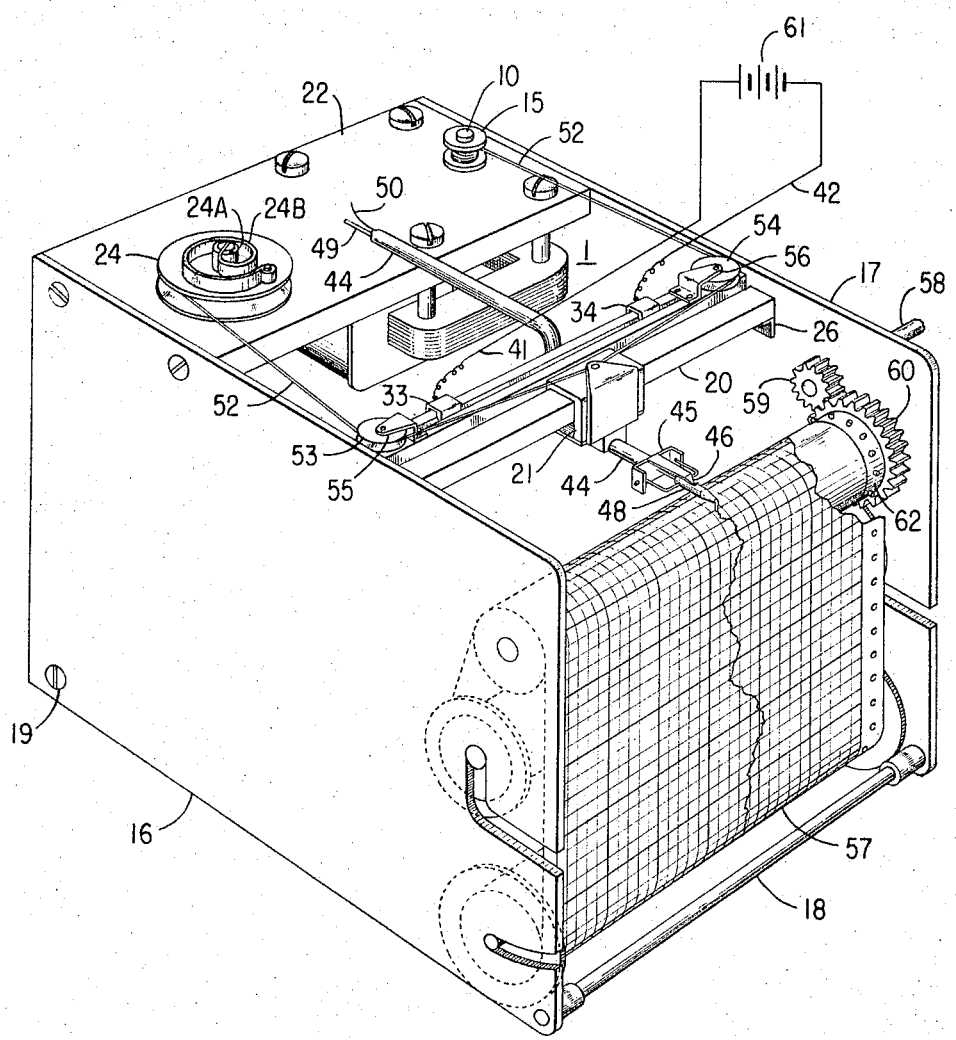
FIG. 3 is a perspective view of the recorder of the invention.

The recorder comprises two side plates 16 and 17 (FIG. 3) assembled together by rods 18 and 19, and a bar 20 serving as a rail for the carriage 21. A mounting plate 22 supports the motor 1 and a spiral spring loaded pulley 24. Motor 1 is located under plate 22 with the shaft 10 passing through plate 22 in such a manner that pulley 15, secured to said shaft is located above said plate. Pulley 24 is also located above plate 22 and is rotatably mounted on a shaft 24A secured to the plate 22. One end of a spiral spring 24B is fastened to the shaft 24A and the other end to pulley 24.

Figure 4:
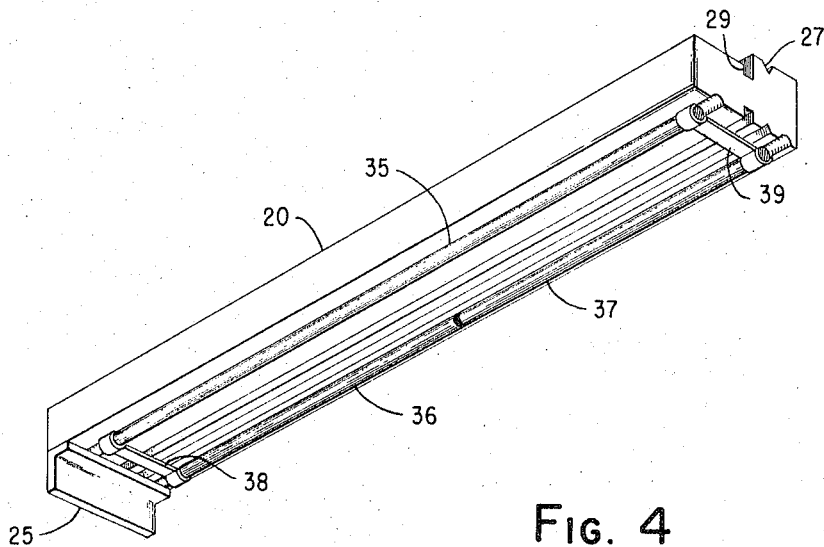
FIG. 4 shows the guiding means for the sliding-contact carrying carriage in the recorder.
Figure 5:
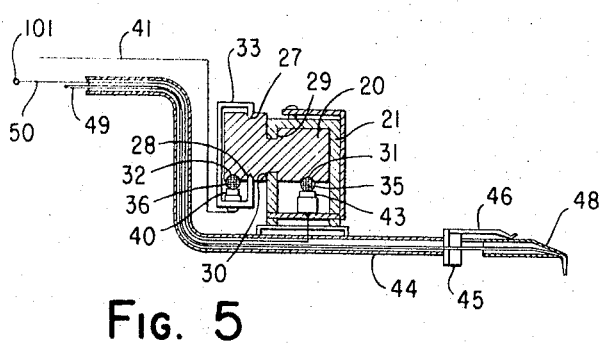
FIG. 5 is a view of the stylus-holder, carriage and guiding means, the latter being shown in cross-section.

Bar 20 is shown in greater detail in FIGS. 4 and 5. It is made of insulating material, has an elongated shape and is secured at both its ends to side plates 16 and 17 by angle irons 25 and 26, one of which may be seen in FIG. 3 and the other in FIG. 4. On its upper face, the bar is provided with two longitudinal grooves 27 and 29, and on its lower face, with four longitudinal grooves 28, 30, 31 and 32. Grooves 27 and 28 play the part of slippers for metallic bridge connectors 33 and 34, which are C-shaped and can slide along said slippers. Grooves 29 and 30 serve as slippers for the main body of carriage 21, also C-shaped. Groove 31 receives a rod 35 of resistive material, graphite for example, while groove 32 receives two half-rods 36 and 37 of the same material. Rods 35 and 36 are electrically interconnected by a conducting bar 38, and rods 35 and 37 are electrically interconnected by a conducting bar 39.

Bridge connectors 33 and 34 are provided with brushes 40 which respectively contact the resistive half-rods 36 and 37. Current-lead wires 41 and 42 (FIG. 3) from a constant voltage source 61 are connected to slippers 33 and 34 respectvely. Thus, it is seen that rod 35 operates like a potentiometric resistance supplied between its ends by a voltage depending on the position of connectors 33 and 34 along the guide bar 20.

Carriage 21 is provided with a brush 43 which contacts the resistive rod 35. To carriage 21 is also secured a stylus-carrying tube 44, provided with a hinge connection 45, the end part of which carries stylus 48; a flat spring 46 presses stylus 48 on the recording medium. Tube 44 contains an ink-feeding duct 49 for stylus 48 and an electrical connection 50 leading to the brush 43 of carriage 21.

A piece of string 52 (FIG. 3) is secured on one hand to pulley 15 and on the other hand to the spiral spring loaded pulley 24. String 52 passes over two intermediate pulleys 53 and 54, the frames 55 and 56 of which are secured to bar 20. String 52 is also secured to the carriage 21 located between pulleys 53 and 54.

The recording medium is a paper strip 57 driven by shaft 58, a motor (not shown) and pinions 59 and 60. On the shaft of pinion 60 is mounted a wheel 62 provided with radial sprockets which penetrate into holes provided along the sides of the paper strip. The feeding and receiving rollers for the paper are not shown in FIG. 3, as such mechanisms are well known in the art and do not need to be described in greater detail here.

The amplified error signal is applied to winding 14 of motor 1, which causes the torque thereof to depend on the magnitude of said signal. When the torque of the motor exceeds that of spring 24B, carriage 21 moves from left to right, toward side plate 17 (assuming the winding direction of string 52 to be that represented in FIG. 3 with respect to pulleys 15 and 24); otherwise said, it moves in the direction for which the voltage at brush 43 increases. This causes the error signal to decrease, and consequently the torque of the motor to decrease until it reaches a value equal to that of the torque of the spiral spring 24A. Conversely, when the torque of the motor is lower than that of the spring, carriage 21 moves from right to left, toward side plate 16, in the direction for which the voltage at brush 43 decreases; the error signal again decreases and, consequently, the torque of the motor changes until it again reaches a value equal to that of the torque of the spring. When minimum control signal exists, the error signal may be biased to give the motor a torque equal to that required to give minimum chart reading.

Figure 6:
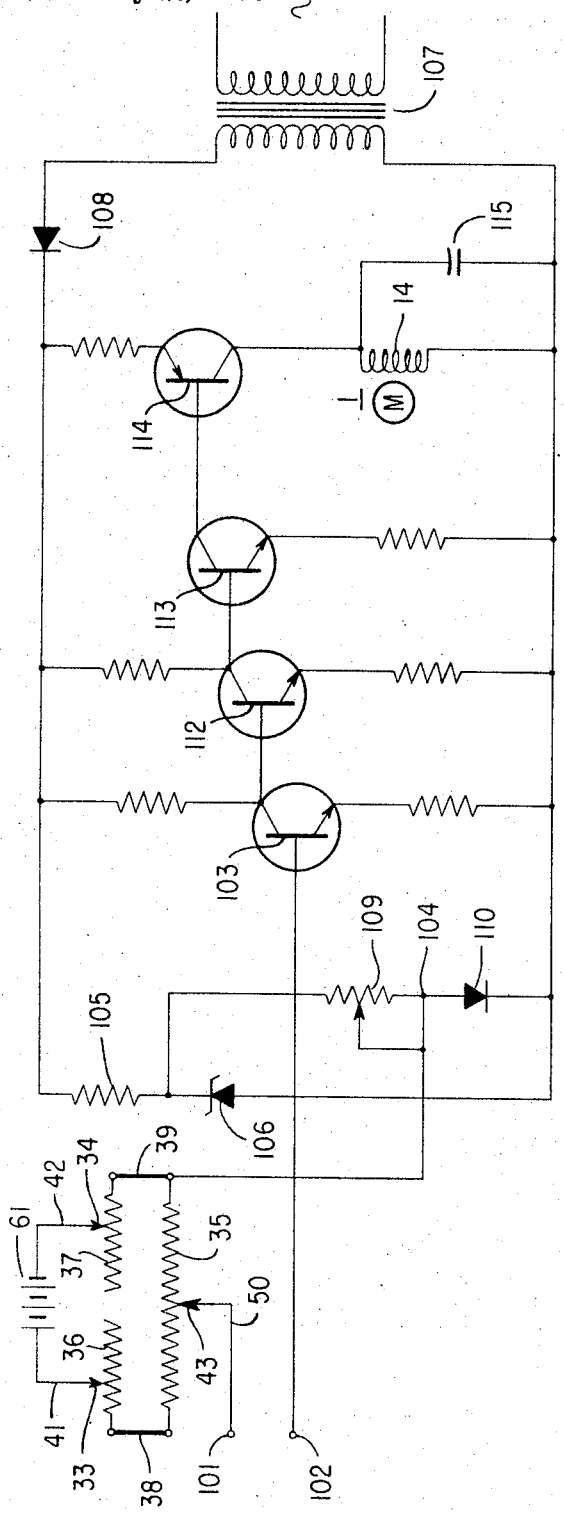
FIG. 6 is a diagram of an amplifier included in the recorder.

The amplifier for the error signal is located under plate 22 and motor 23. Its electric diagram is shown in FIG. 6, while FIG. 7 shows the voltage wave forms at various points in the amplifier.

The control signal for the recorder is applied to terminals 101 and 102. Terminal 101 is connected to the wire 50 of carriage 21, and terminal 102 is connected to the base of the first transistor 103 in the amplifier. The lead wire 42 of the potentiometer included in the recorder is connected through an adjustable resistor 109 to the intermediate point 104 of a voltage divider consisting of resistor 109 and a diode 110; said voltage divider is shunted across a Zener diode 106 fed through a resistor 105 from a rectified current source consisting of transformer 107 and diode 108. It is thus seen that the error signal, i.e. the difference between the control signal and the output voltage of the potentiometer, is applied between the base of transistor 103 and point 104.

Figure 7:
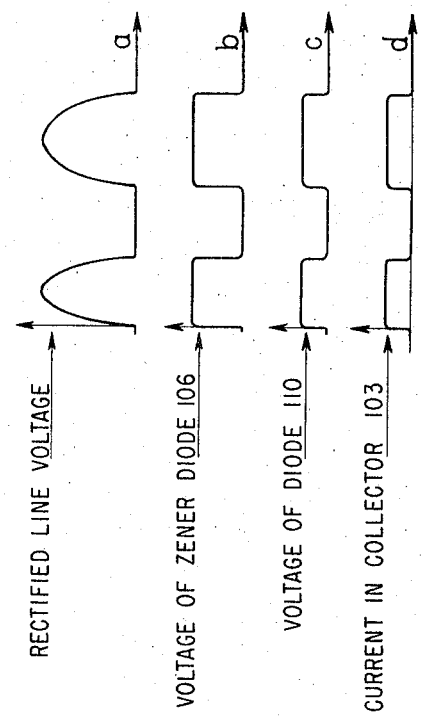
FIG. 7 is a diagram of signals at various points of the amplifier of FIG. 6.

Line $a$ of FIG. 7 shows the rectified supply voltage, line $b$ the voltage across the Zener diode 106, and line $c$ the voltage across diode 110. The latter voltage has a rectangular wave shape and its amplitude is selected equal to the threshold unblocking voltage of transistor 103. Thus the transistor 103 will be conducting even though no error signal exists or a predetermined minimum error signal exists. Transistor 103 also passes current through during the positive pulses and its collector current is then proportional to the amplitude of the error signal (line $d$) plus the bias signal (line $c$). Pulses having an amplitude proportional to that of the error signal and the bias signal are amplified in transistors 112, 113 and 114, and the amplified pulsed current is applied to the winding 14 of motor 1. The component at the network frequency of said pulsed current is extracted by means of capacitor 115 which is in parallel connection with winding 14 and forms therewith a resonant circuit tuned to the 60 Hz. power line frequency.

The value of the voltage appearing across diode 110 is adjusted by means of the adjustable resistor 109. This voltage is adjusted to have a value so that the motor torque just balances the spring torque for minimum reading on chart 57. In other words, there exists a permanent input bias such that the motor torque is equal to that of the spring when the stylus is at minimum position corresponding to the lowest value of the control signal it is desired to record.

Of course, many variants of the embodiment of my invention that I have chose to illustrate and describe may be imagined by the man of the art. For instance, the movable carriage, instead of carrying a recording stylus, could cause a pointer to move along a dial. Such variants remain within the scope of the invention.

What I desire to secure by Letters Patent of the United States, is:

1. Apparatus for exhibiting the magnitude of a variable, comprising,
   a stylus operative to produce a graphic record,
   a graphic record support medium,
   a stylus carrying carriage cooperating with said support medium and said stylus to produce said graphic record,
   a potentiometer resistance means,
   a support bar for said potentiometer resistance means having guide means for said carriage,
   said carriage means also including a brush in slidable contact with said resistance means thereby functioning as the wiper arm of a potentiometer circuit,
   means for deriving from said resistance means and brush contact a voltage depending on the position of said carriage,
   means for connecting a control signal in series with said brush contact voltage to algebraically add said voltages to derive therefrom an error signal, an alternating-current motor having a single phase winding and a shaded-pole winding,
an electronic amplifier responsive to said error signal producing a current flow through said single phase winding proportional to the magnitude of said error signal,
a spiral spring,
and means for mechanically coupling said motor, spring and carriage thereby causing said carriage to move whenever an unbalance exists between the torque produced by said spiral spring and said motor.

2. Apparatus as set forth in claim 1 wherein said comparing means includes an adjustable voltage divider for biasing said motor torque at zero error signal.

3. Apparatus as set forth in claim 1 wherein said means for deriving a voltage depending on the carriage position includes a voltage source connected to the ends of said resistance means.

4. Apparatus as set forth in claim 1 wherein said electronic amplifier consists of four direct coupled transistorized stages.

References Cited
UNITED STATES PATENTS

| | | | |
|---|---|---|---|
| 1,991,322 | 2/1935 | Guttinger et. al. | 318—160 |
| 2,039,300 | 5/1936 | Drake | 318—160 |
| 2,491,906 | 12/1949 | Ray. | |
| 2,551,833 | 5/1951 | Ewing | 318—160 X |
| 2,796,567 | 6/1957 | Boode. | |
| 2,925,544 | 2/1960 | Lang | 318—436 X |

ORIS L. RADER, *Primary Examiner.*

T. LYNCH, *Examiner.*